UNITED STATES PATENT OFFICE.

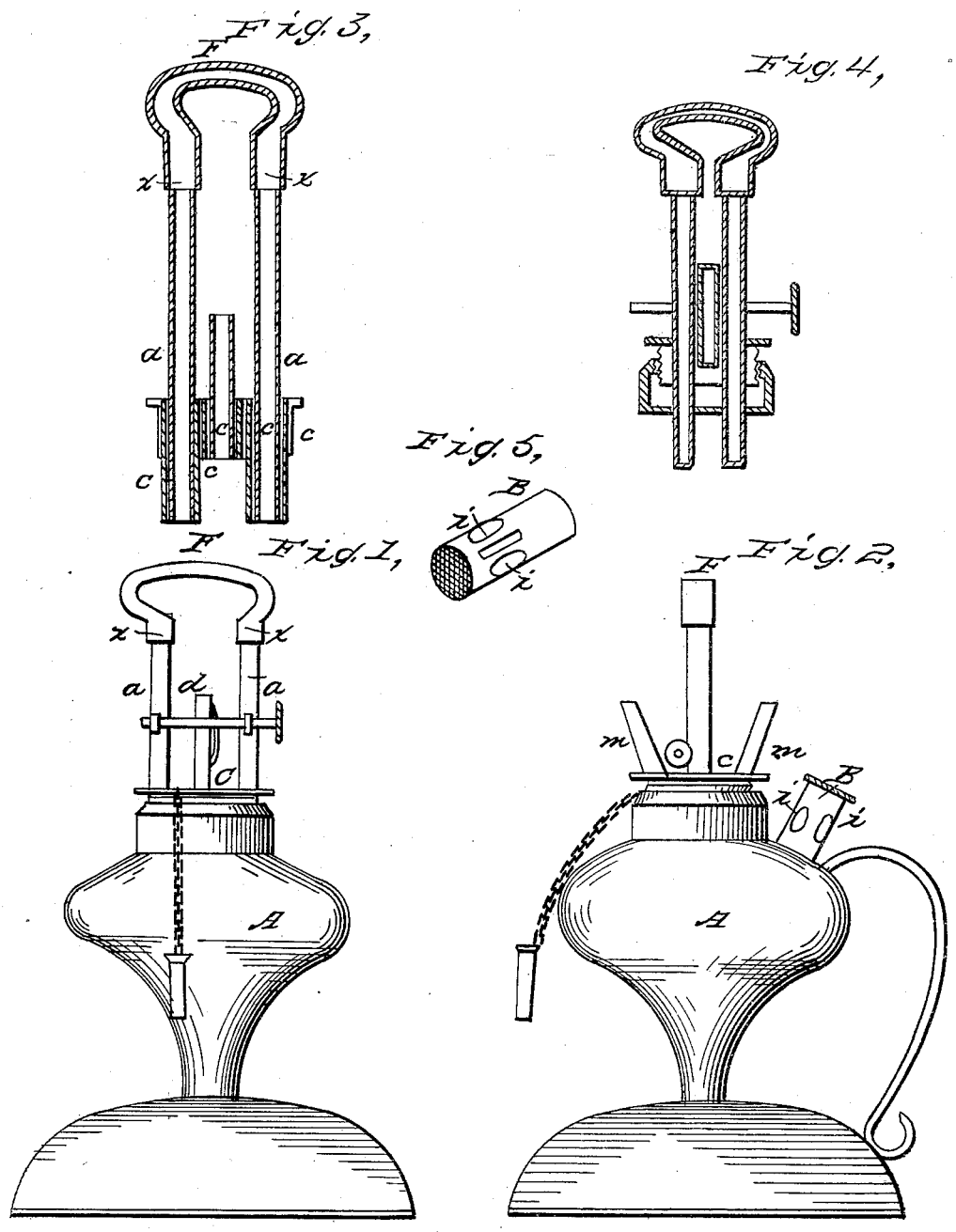
JOHNSON & BAILEY.
Vapor Burner.
No. 22,253.
Patented Dec. 7, 1858.

F. BAILEY AND JOSEE JOHNSON, OF NEW YORK, N. Y.

BURNER FOR LAMPS.

Specification of Letters Patent No. 22,253, dated December 7, 1858.

*To all whom it may concern:*

Be it known that we, FREDERICK BAILEY and JOSEE JOHNSON, of the city and State of New York, have invented certain new and useful Improvements in Gas-Generating-Fluid Lamps; and we do hereby declare that the following is a full, clear, and exact description of the same, reference being had to the accompanying drawings and to the letters of reference marked thereon.

The nature of our invention consists in the employment and arrangement of the several parts, which will be hereinafter particularly described.

In order that those skilled in the art may make and use our invention we will proceed to describe its operation and construction.

In the annexed drawings A, represents the body of the lamp, which is constructed in any of the known ways and forms.

C, represents the top of the lamp. This top screws into the lamp in the ordinary manner. It is provided with ten tubes, five of which are of glass, and five of metal. The glass tubes extend only through the top of the lamp from top to bottom and are cemented, or secured firmly to the said top. The metal tubes pass into these glass tubes, and extend up above the top and are secured in them. The two metal tubes $a, a$, are connected at their upper extremity by the circular retort F, which joins to said tubes at the point $x, x$. The tubes $a, a$, are made of very thin metal, and the retort F, is made of thick metal, so that one may retain the heat, and the other will not. The retort may be made in different forms, and is perforated with small holes through which the gas escapes to be burned.

$d$, is a tube situated between the tubes $a, a$, and immediately under the retort F.

$m$, and $n$, are two ordinary tubes situated on each side of the tubes $a, a$, and $d$. The tubes $m, n$, and $d$, are provided with wick which comes above their upper extremity and which conveys up the fluid for burning in the ordinary manner. The tubes $a, a$, are also provided with wick which extends up in them only to that point where the retort joins them there being no wick in the retort.

When the burning fluid is put into the lamp and we wish to burn the gas generated from it, we light the wick in tube $d$. The flame from this tube strikes the retort, and heats it. The heat of the flame is radiated also on the sides and heats the wick tubes $a, a$. This heat converts the fluid into gas which rises into the retort F, and passes out at the small holes in it and is consumed. The gas being once started and the retort heated, the flame of tube $d$, may be extinguished, and the heat of the retort will be sufficient to generate the gas,—but by allowing the tube $d$, to continue burning a much brighter light will be made, as more gas will be generated. The tubes $a, a$, are made thin to prevent the heat descending to the lamp. The metal tubes, are also set in the glass tubes $c, c, c, c$, which are non-conductors, and prevent the heat passing down and heating the fluid in the lamp.

The barrel B, is provided with windows of glass or of mica in order that we may ascertain the amount of fluid in the lamp when filling, or when desirable. This barrel is also provided at its lower extremity with wire gauze so that the fluid can not take fire when the lamp is being filled.

The arrangement of the several parts of this lamp is such that the amount of light is very easily regulated. If we wish to use a bright light, we have the small tube $d$, burning under the retort, thus generating a great deal of gas. Less light will be made by extinguishing the tube $d$, and less still may be made by using the tubes $m, n$, without the retort. Thus the light may be regulated to suit circumstances.

Having thus fully described our invention what we claim as new and desire to secure by Letters Patent is—

The combination in a lamp of the tubes $a, a, d$, and $m, n$, glass tubes ($c, c, c,$) and barrel B, the same being constructed and operated substantially in the manner and for the purpose herein set forth.

FREDERICK BAILEY.
    JOSEE JOHNSON.

Witnesses as to F. Bailey:
 PETER VAN ANTWERP,
 JOHN A. MAPES.
Witnesses as to Josee Johnson:
 C. M. ALEXANDER,
 A. A. YEATMAN.